(12) United States Patent
Rouse et al.

(10) Patent No.: US 10,125,326 B2
(45) Date of Patent: Nov. 13, 2018

(54) DEMULSIFIERS

(71) Applicant: CRODA INTERNATIONAL PLC, Yorkshire (GB)

(72) Inventors: Sean Philip Nigel Rouse, Yorkshire (GB); James Alan Prodger, Yorkshire (GB); Craig Allan Davies, Yorkshire (GB)

(73) Assignee: Croda International Plc, East Yorkshire (GB)

( * ) Notice: Subject to any disclaimer, the term of this patent is extended or adjusted under 35 U.S.C. 154(b) by 110 days.

(21) Appl. No.: 15/312,057

(22) PCT Filed: May 8, 2015

(86) PCT No.: PCT/GB2015/051350
§ 371 (c)(1),
(2) Date: Nov. 17, 2016

(87) PCT Pub. No.: WO2015/177508
PCT Pub. Date: Nov. 26, 2015

(65) Prior Publication Data
US 2017/0114287 A1  Apr. 27, 2017

(30) Foreign Application Priority Data
May 19, 2014 (GB) .................... 1408823.1

(51) Int. Cl.
*B01D 17/04* (2006.01)
*C10G 33/04* (2006.01)
*C08G 65/26* (2006.01)
*C08G 65/332* (2006.01)

(52) U.S. Cl.
CPC ........... *C10G 33/04* (2013.01); *B01D 17/047* (2013.01); *C08G 65/2615* (2013.01); *C08G 65/3322* (2013.01)

(58) Field of Classification Search
CPC ............. B01D 17/047; C08G 65/2615; C08G 65/3322
See application file for complete search history.

(56) References Cited

U.S. PATENT DOCUMENTS

| | | | | |
|---|---|---|---|---|
| 2,950,299 A * | 8/1960 | Kirkpatrick | ............ | C10G 33/04 516/187 |
| 2,987,490 A | 6/1961 | Kirkpatrick et al. | | |
| 3,056,748 A * | 10/1962 | Kocher | ................... | C10G 33/04 516/184 |
| 4,209,333 A * | 6/1980 | Ong | .................... | B01F 17/0028 106/31.25 |
| 4,324,734 A * | 4/1982 | Rehm | ..................... | C08G 63/87 516/187 |
| 4,524,007 A * | 6/1985 | Chibnik | ............... | B01D 17/047 508/480 |
| 5,158,697 A | 10/1992 | Kawamori et al. | | |
| 5,609,794 A * | 3/1997 | Taylor | .................. | B01D 17/047 516/184 |
| 6,429,324 B1 * | 8/2002 | Raths | ....................... | C07C 67/26 554/149 |
| 7,041,707 B2 * | 5/2006 | Hahn | ................... | B01D 17/047 507/117 |
| 9,695,366 B2 * | 7/2017 | Bevinakatti | ............ | C10G 33/04 |
| 2014/0228456 A1 * | 8/2014 | Bevinakatti | .......... | B01D 17/047 516/185 |
| 2016/0075944 A1 * | 3/2016 | Blease | ................... | C09K 17/18 252/194 |
| 2017/0342341 A1 * | 11/2017 | Maker | .................. | C10M 145/36 |

FOREIGN PATENT DOCUMENTS

| | | |
|---|---|---|
| EP | 2174972 | 4/2010 |
| JP | 2008115091 | 5/2008 |
| WO | 2013041876 | 3/2013 |

OTHER PUBLICATIONS

International Search Report for PCT/GB2015/051350, dated Nov. 8, 2015, 3 pages.
International Preliminary Report on Patentability and Written Opinion for International Application No. PCT/GB2015/051350, dated Nov. 22, 2016, 6 pages.

* cited by examiner

*Primary Examiner* — Michael A Salvitti
(74) *Attorney, Agent, or Firm* — RatnerPrestia

(57) ABSTRACT

The present invention provides a demulsifier comprising a compound of the general formula (I), a demulsification formulation comprising the demulsifier, methods of making a demulsifier, a method of demulsifying an oil-in-water or a water-in oil emulsion and the use as a demulsifier of a compound comprising a dimer and/or trimer fatty residue and an alkyleneoxy chain comprising a first ethyleneoxy section, a second ethyleneoxy section, and a propyleneoxy section located between the first ethyleneoxy section and the second ethyleneoxy section, wherein the propyleneoxy section comprises from 1 to 20 propyleneoxy groups. The demulsifier may be for use in demulsifying an emulsion, for example crude oil.

17 Claims, No Drawings

DEMULSIFIERS

CROSS REFERENCE TO RELATED APPLICATIONS

This application is the National Stage filing of International Appln. No. PCT/GB2015/051350, filed 8 May 2015, and claims priority of GB Application No. 1408823.1, filed 19 May 2014, the entirety of which applications is incorporated herein by reference for all purposes.

The present invention relates to a demulsifier, a demulsification formulation, methods of making a demulsifier, a method of demulsifying an oil-in-water or a water-in-oil emulsion and the use of a compound as a demulsifier. The demulsifier may be for use in demulsifying an emulsion, for example crude oil.

Demulsifiers, or emulsion breakers, are chemicals which may be used to separate the phases of an emulsion. A demulsifier may be used to separate water from a crude oil emulsion. Demulsifiers are used in the processing of crude oil which is typically recovered from onshore or offshore oilfields along with significant quantities of water. The water may be salt water or brine, for example sea or ocean water. It is important to remove the water from the crude oil as quickly as possible to allow dry oil to be stored and transported as necessary. Separating the water from the oil will also allow 'clean' water or brine, i.e. containing no or insignificant amounts of oil, to be discharged.

Known demulsifiers include polymeric surfactants such as polymers formed from mixtures of propylene oxide and ethylene oxide residues, polyethyleneimines or alkylphenol-formaldehyde resins.

Some known demulsifiers comprise a majority of nonylphenol resin compounds which may not be considered to be environmentally friendly compounds. The discharging of these demulsifiers onshore or into the sea may increase the levels of phenol groups present in the local environment which may increase the risk of harm to wildlife such as aquatic life present in the area.

U.S. Pat. No. 2,987,490 provides an example of a known demulsifying agent for treating petroleum emulsions. It describes compositions which are esters of a trimer of a polyethenoid fatty acid (i.e. a trimer of a polyunsaturated fatty acid such as linoleic and/or linolenic acid) and various hydroxy containing compositions. A number of the hydroxy containing compositions are phenol formaldehyde resins which may not be considered to be environmentally friendly for the reasons discussed above.

It is an object of the present invention to address at least one of the above or other disadvantages associated with the prior art.

In one aspect, the present invention seeks to provide a demulsifier which may be more environmentally acceptable than a nonyl-phenol or phenol-formaldehyde resin but which has suitable properties to act as a demulsifier. These suitable properties may include one or more of a Relative Solubility Number (RSN), viscosity, pour point, molecular weight and a reduction in the interfacial tension in a standard emulsion system to which the demulsifier is applied.

The present invention is based in part on the recognition that a compound comprising at least one of a dimer fatty diacid, a trimer fatty triacid, a dimer fatty diol and/or a trimer fatty triol and at least one alkyleneoxy chain (i.e. a sequence of alkyleneoxy groups) may demonstrate suitable or improved properties for use as a demulsifier. The alkyleneoxy chain comprises a first ethyleneoxy section, then a propyleneoxy section and then a second ethyleneoxy section. Without being bound by theory, it is believed that this structure of the demulsifier allows it to locate itself effectively at an oil-water interface. The dimer fatty diacid, trimer fatty triacid, dimer fatty diol and/or trimer fatty triol is hydrophobic and may tend to locate in the oil phase. The first and second ethyleneoxy sections are hydrophilic and may tend to locate in the water phase. The propyleneoxy section is less hydrophilic than the first and second ethyleneoxy sections and may tend to locate nearer to the water-oil interface than the ethyleneoxy sections. This structure may allow the demulsifier to locate itself effectively at an oil-water interface.

Thus viewed from a first aspect, the present invention provides a demulsifier comprising a compound of the general formula (I):

$$R^1[(EO)_p(PO)_q(EO)_rR^2]_n \quad (I)$$

where:
- $R^1$ is a residue of at least one of: a dimer fatty diacid, a trimer fatty triacid, a dimer fatty diol and/or a trimer fatty triol;
- $R^2$ is H or $(CO)_xR^3$ where x is 0 or 1 and $R^3$ is a $C_1$ to $C_6$ aliphatic hydrocarbyl group;
- EO is an ethyleneoxy group;
- PO is a propyleneoxy group;
- p is from 1 to 20;
- q is from 1 to 20;
- r is from 1 to 20; and
- n is from 1 to 3.

Viewed from a second aspect, the present invention provides a demulsification formulation comprising 0.1 to 80 wt % of a demulsifier of the first aspect.

Viewed from a third aspect, the present invention provides a method of making a demulsifier comprising the steps of:
a) forming an alkylene oxide chain of the general formula (II):

$$HO-(EO)_p(PO)_q(EO)_r-H \quad (II)$$

where:
- EO is an ethyleneoxy group;
- PO is a propyleneoxy group;
- p is from 1 to 20;
- q is from 1 to 20; and
- r is from 1 to 20; and b) reacting the alkylene oxide chain with at least one of: a dimer fatty diacid and/or a trimer fatty triacid.

Viewed from a fourth aspect, the present invention provides a method of making a demulsifier comprising the steps of:
a) reacting at least one of: a dimer fatty diacid, a trimer fatty triacid, a dimer fatty diol and/or a trimer fatty triol, with 2 to 60 mols of ethylene oxide;
b) reacting the product of step a) with 2 to 60 mols of propylene oxide; and
c) reacting the product of step b) with 2 to 60 mols of ethylene oxide.

Viewed from a fifth aspect, the present invention provides a method of demulsifying an oil-in-water or a water-in-oil emulsion comprising the step of adding a demulsifier of the first aspect to the emulsion.

Viewed from a sixth aspect, the present invention provides the use as a demulsifier of a compound comprising a dimer and/or trimer fatty residue and an alkyleneoxy chain comprising a first ethyleneoxy section, a second ethyleneoxy section, and a propyleneoxy section located between the first ethyleneoxy section and the second ethyleneoxy section, wherein the propyleneoxy section comprises from 1 to 20 propyleneoxy groups.

It will be understood that any upper or lower quantity or range limit used herein may be independently combined.

It will be understood that, when describing the number of carbon atoms in a substituent group (e.g. 'C1 to C6'), the number refers to the total number of carbon atoms present in the substituent group, including any present in any branched groups. Additionally, when describing the number of carbon atoms in, for example fatty acids, this refers to the total number of carbon atoms including the one at the carboxylic acid, and any present in any branch groups.

Many of the chemicals which may be used to produce the demulsifier of the present invention are obtained from natural sources. Such chemicals typically include a mixture of chemical species due to their natural origin. Due to the presence of such mixtures, various parameters defined herein can be an average value and may be non-integral.

The term 'functionality' as used herein with regard to a molecule or part of a molecule refers to the number of functional groups in that molecule or part of a molecule. A carboxylic acid group, a hydroxyl group and an amine group are all examples of functional groups. For example, a diacid (with two carboxylic acid groups) and a diol (with two hydroxyl groups) both have a functionality of 2 and a triacid and triol both have a functionality of 3.

The term 'residue' as used herein is the part of a reactant molecule which remains in the reaction product compound after a reaction has occurred.

The term 'dimer fatty diacid' (also referred to as dimer fatty acid) is well known in the art, and refers to the dimerisation products of mono- or poly-unsaturated fatty acids and/or esters. Due to the carboxylic acid group on each individual fatty acid (monomer), a dimer fatty diacid comprises two carboxylic acid groups. The related term 'trimer fatty triacid' similarly refers to trimerisation products of mono- or polyunsaturated fatty acids and/or esters.

The term 'dimer fatty residue' as used herein, unless otherwise defined, refers to a residue of a dimer fatty diacid or a residue of a dimer fatty diacid derivative such as a dimer fatty diol or a dimer fatty diamine.

The term 'trimer fatty residue' as used herein, unless otherwise defined, refers to a residue of a trimer fatty triacid or a residue of a trimer fatty triacid derivative such as a trimer fatty triol or a trimer fatty triamine.

Dimer fatty diacids are described in T. E. Breuer, 'Dimer Acids', in J. I. Kroschwitz (ed.), Kirk-Othmer Encyclopedia of Chemical Technology, 4th Ed., Wily, New York, 1993, Vol. 8, pp. 223-237. They are prepared by polymerising fatty acids under pressure, and then removing most of the unreacted fatty acid starting materials by distillation. The final product usually contains some small amounts of mono fatty acid and trimer fatty triacids, but is mostly made up of dimer fatty diacids. The resultant product may be prepared with various proportions of these different components as desired.

The weight ratio of dimer fatty residues to trimer fatty residues can be varied, by modifying the processing conditions and/or the unsaturated fatty acid feedstock. In the demulsifier of the first aspect of the invention, the weight ratio of di-functional material (dimer fatty diacid and/or dimer fatty diol) to tri-functional material (trimer fatty triacid and/or trimer fatty triol) may be from 20 to 0.2:1, preferably from 5 to 0.2:1, more preferably from 4 to 0.5:1. For example, $R^1$ may comprise a mixture of dimer fatty diacid residues and trimer fatty triacid residues. The weight ratio of dimer fatty diacid to trimer fatty triacid may be from 20 to 0.2:1, preferably from 5 to 0.2:1, more preferably from 4 to 0.5:1. $R^1$ may be a residue of at least one of a dimer fatty diacid and/or a trimer fatty triacid.

The dimer fatty diacids or dimer fatty residues used in the present invention are preferably derived from the dimerisation products of C10 to C30 fatty acids, more preferably C12 to C24 fatty acids, particularly C14 to C22 fatty acids, further preferably C16 to C20 fatty acids, and especially C18 fatty acids. Thus, the resulting dimer fatty diacids may comprise in the range from 20 to 60, preferably 24 to 48, particularly 28 to 44, further preferably 32 to 40, and especially 36 carbon atoms.

The fatty acids, from which the dimer fatty diacids are derived, may be selected from linear or branched unsaturated fatty acids. The unsaturated fatty acids may be selected from fatty acids having either a cis/trans configuration, and may have one or more than one unsaturated double bonds. Preferably, the fatty acids used are linear monounsaturated fatty acids.

Suitable dimer fatty diacids are preferably derived from (i.e. are the dimer equivalents of) the dimerisation products of oleic acid, linoleic acid, linolenic acid, palmitoleic acid, or elaidic acid. In particular, suitable dimer fatty diacids are derived from oleic acid. The dimer fatty diacid may not be derived from a feedstock in which linoleic or linolenic acid are the component with the highest wt % in the feedstock.

The dimer fatty diacids may be dimerisation products of unsaturated fatty acid mixtures obtained from the hydrolysis of natural fats and oils, e.g. sunflower oil, soybean oil, olive oil, rapeseed oil, cottonseed oil, or tall oil. The dimer fatty diacids may be derived from a feedstock in which rapeseed (rape) oil or soybean (soya) oil is the component with the highest wt % in the feedstock.

The molecular weight (weight average) of the dimer fatty diacid may be in the range from 450 to 690, more preferably 500 to 640, particularly 530 to 610, and especially 550 to 590.

In addition to the dimer fatty diacids, dimerisation usually results in varying amounts of trimer fatty triacids (so-called "trimer"), oligomeric fatty acids, and residues of monomeric fatty acids (so-called "monomer"), or esters thereof, being present. The amount of monomer can, for example, be reduced by distillation.

Similarly, the trimer fatty triacids are preferably derived from the trimerisation products of the materials mentioned with regard to the dimer fatty acids, and are preferably trimers of 010 to C30, more preferably C12 to C24, particularly C14 to C22, further preferably C16 to C20 fatty acids, and especially C18 fatty acids. Thus, the trimer fatty triacids may contain in the range from 30 to 90, more preferably 36 to 72, particularly 42 to 66, further preferably 48 to 60, and especially 54 carbon atoms.

Preferably, $R^1$ is a residue of at least one of: a dimer fatty diacid having from 24 to 48 carbon atoms, a trimer fatty triacid having from 36 to 72 carbon atoms, a dimer fatty diol having from 24 to 48 carbon atoms and/or a trimer fatty triol having from 36 to 72 carbon atoms.

The molecular weight (weight average) of the trimer fatty triacids may be in the range from 750 to 950, more preferably 790 to 910, particularly 810 to 890, and especially 830 to 870.

The dimer fatty acid may comprises less than 10 wt %, more preferably less than 6 wt %, particularly preferably less than 4 wt % of mono fatty monoacid (or monomer).

All of the above weight percentage values are based on the total weight of polymerised fatty acids and mono fatty acids present.

The dimer fatty residues may be hydrogenated. The dimer fatty residues may be non-hydrogenated. Preferably the dimer fatty residues and/or trimer fatty residues are non-hydrogenated.

A dimer fatty diacid may be converted to a dimer fatty diol as is known in the art. For example, a dimer fatty diol may be formed by hydrogenation of the corresponding dimer fatty diacid. A dimer fatty diol may have properties as described herein with regard to a dimer fatty diacid (or dimer fatty acid) except that the acid groups in the dimer fatty diacid are replaced with hydroxyl groups in the dimer fatty diol. In a similar manner, a trimer fatty triacid may be converted to a trimer fatty triol which may have properties as described herein with regard to a trimer fatty triacid.

The dimer fatty diol may be hydrogenated. The dimer fatty diol may be non-hydrogenated. The compound of the general formula (I) is also referred to herein as compound (I). Compound (I) comprises at least one ethyleneoxy group, EO ($-C_2H_4O-$). An ethyleneoxy group may also be referred to herein as an ethylene oxide equivalent. Compound (I) comprises at least one propyleneoxy group, PO ($-C_3H_6O-$). A propyleneoxy group may also be referred to herein as a propylene oxide equivalent. An alkyleneoxy group may be referred to herein as an alkylene oxide equivalent.

Where the number of ethyleneoxy groups and propyleneoxy groups is given in terms of per molecule, preferably this is the average number of groups per molecule in a sample of the product. Individual molecules in the sample may have fewer or greater than the stated number of groups, but on average the sample will comprise molecules having an average of the stated number of groups.

The compound (I) has a first ethyleneoxy section designated by $(EO)_p$ in formula (I). The value of p is from 1 to 20, meaning there are from 1 to 20 ethyleneoxy groups (or ethylene oxide equivalents) in the first ethyleneoxy section. Preferably p is at least 2, more preferably at least 3, yet more preferably at least 4, especially preferably at least 5. Preferably p is at most 18, more preferably at most 15, yet more preferably at most 12, especially preferably at most 10. Preferably, p is from 3 to 15.

The compound (I) has a propyleneoxy section designated by $(PO)_q$ in formula (I). The value of q is from 1 to 20, meaning there are from 1 to 20 propyleneoxy groups (or propylene oxide equivalents) in the propyleneoxy section. Preferably q is at least 2, more preferably at least 3, yet more preferably at least 4, especially preferably at least 5. Preferably q is at most 18, more preferably at most 15, yet more preferably at most 12, especially preferably at most 10. Preferably, q is from 3 to 15.

The amount of propyleneoxy groups in the compound may affect the pour point of the compound. A higher number of propyleneoxy groups may reduce the pour point, which may be desirable if the demulsifier is to be used in a cold environment. Having the value of q from 3 to 15 may provide a suitable number of propylene oxide equivalents to advantageously reduce the pour point of the demulsifier.

The compound (I) has a second ethyleneoxy section designated by $(EO)_r$ in formula (I). The value of r is from 1 to 20, meaning there are from 1 to 20 ethyleneoxy groups (or ethylene oxide equivalents) in the second ethyleneoxy section. Preferably r is at least 2, more preferably at least 3, yet more preferably at least 4, especially preferably at least 5. Preferably r is at most 18, more preferably at most 15, yet more preferably at most 12, especially preferably at most 10. Preferably, r is from 3 to 15.

The ethyleneoxy sections and propyleneoxy sections may contain minor proportions of other alkylenoxy groups. For example, the propyleneoxy section may include minor proportions of butyleneoxy groups. The minor proportion of such other alkylenoxy units may not be more than 10 mol % and is preferably not more than 5 mol % of the total alkyleneoxy groups in the respective section.

The value of n in compound (I) indicates the average number of alkyleneoxy chains in compound (I) and is from 1 to 3. A dimer residue may have up to two alkyleneoxy chains attached to it and a trimer residue may have up to 3 alkyleneoxy chains attached to it. The value of n is preferably from 1.2 to 3, more preferably from 1.5 to 3, yet more preferably from 1.8 to 3, especially preferably from 2 to 3. The value of n may be at least 2, preferably at least 2.05, more preferably at least 2.1. The value of n may be at most 3, preferably at most 2.9, more preferably at most 2.8.

The number of ethyleneoxy groups in an alkyleneoxy chain may be given by (p+r). The value of (p+r) may be from 2 to 40, preferably from 4 to 36, more preferably from 6 to 30.

The total number of alkyleneoxy groups in an alkyleneoxy chain may be given by p+q+r. The value of p+q+r is at least 3 and may be at least 6, preferably at least 9. The value of p+q+r is at most 60 and may be at most 51, preferably at most 45.

The ratio of individual ethyleneoxy groups to propyleneoxy groups in an alkyleneoxy chain may be given by the ratio of (p+r) to q. The ratio of (p+r) to q may be from 0.5 to 8:1, preferably from 0.5 to 6:1, more preferably from 1 to 4:1 particularly preferably from 1.5 to 2.5:1. These ratios of ethyleneoxy to propyleneoxy groups may provide a suitable balance between the hydrophilic ethyleneoxy groups and the less hydrophilic propyleneoxy groups which may advantageously allow compound (I) to locate at an oil-water interface and be effective as a demulsifier.

The relative length of the first ethyleneoxy segment to the propyleneoxy segment to the second ethyleneoxy segment may be given by the ratio of p to q to r. The ratio of p to q to r may be from 0.5 to 2:from 0.5 to 2:from 0.5 to 2, preferably from 0.75 to 1.5:from 0.75 to 1.5:from 0.75 to 1.5 more preferably from 0.8 to 1.2:0.8 to 1.2:0.8 to 1.2. These relative lengths of the first ethyleneoxy segment to the propyleneoxy segment to the second ethyleneoxy segment may provide a suitable balance between the amount of ethyleneoxy groups in the ethyleneoxy sections and the amount of propyleneoxy groups in the propyleneoxy section which may advantageously allow compound (I) to locate rapidly at an oil-water interface and be effective as a demulsifier.

The weight ratio of $R^1$ to total alkyleneoxy (ethyleneoxy and propyleneoxy) groups in compound (I) may be at least 0.1:1, preferably at least 0.2:1. The weight ratio of $R^1$ to alkyleneoxy (ethyleneoxy and propyleneoxy) groups in compound (I) may be at most 1:1, preferably at most 0.8:1, more preferably at most 0.6:1. These relative amounts of the hydrophobic R' group and the hydrophilic alkyleneoxy groups may provide a suitable balance which advantageously allows compound (I) to locate at an oil-water interface and be effective as a demulsifier.

Compound (I) may comprise an optional end cap as shown in the definition of $R^2$ as H or $(CO)_xR^3$ where x is 0 or 1 and $R^3$ is a $C_1$ to $C_6$ aliphatic hydrocarbyl group. The optional end cap may be ether linked (where x is 0) or ester linked (where x is 1). $R^3$ may be a $C_1$ to $C_6$ aliphatic hydrocarbyl group, preferably a $C_1$ to $C_6$ alkyl group, more preferably a $C_1$ to $C_3$ alkyl group. Most preferably there is no end cap i.e. $R^2$ is H.

The compound (I) may have a molecular weight (number average) of at least 500 Da, preferably at least 800 Da, more preferably at least 1000 Da, even more preferably at least 1500 Da.

The compound (I) may have a molecular weight (number average) of at most 20,000 Da, preferably at most 10,000 Da, more preferably at most 5000 Da, even more preferably at most 4000 Da.

The compound (I) may have a molecular weight (weight average) of at least 500 Da, preferably at least 1000 Da, more preferably at least 1500 Da, even more preferably at least 2000 Da, especially preferably at least 2500 Da.

The compound (I) may have a molecular weight (weight average) of at most 20,000 Da, preferably at most 15,000 Da, more preferably at most 10,000 Da, even more preferably at most 8000 Da.

The molecular weight (number average and weight average) may be determined by gel permeation chromatography.

The interfacial tension of an oil/water interface in a reference sample may measured using a Tracker automated drop shape tensiometer manufactured by Teclis. The measurements may be carried out by forming a droplet of toluene (an oil phase) in deionised water (an aqueous phase) and measuring the interfacial tension at the oil/water interface at 25° C. The droplet is then pulsed throughout the test which expands and contracts the droplet area by ±10% before allowing it to relax. A quantity of the demulsifier (such as 10 ppm) is added to the oil phase and the change in interfacial tension at the oil/water interface may be measured. The interfacial tension (e.g. in mN/m) is calculated using the Windrop software from Teclis. The software analyses the drop shape of the oil droplet in the aqueous phase during its expansion and contraction and calculates the corresponding interfacial tension. A reduction in interfacial tension may indicate that the demulsifier is effective in causing the phases to separate by promoting droplet coalescence and therefore indicates its ability to function as a demulsifier.

The time taken for the demulsifier of the first aspect to reduce the interfacial tension of an oil-water interface in a reference sample to 50% of its initial value may be at most 2000 seconds, preferably at most 1000 seconds, more preferably at most 750 seconds. The time taken for the demulsifier to reduce the interfacial tension of an oil-water interface in a reference sample to 50% of its initial value may be at least 30 seconds.

Relative Solubility Number (RSN) is a measure of the solubility of a demulsifier and corresponds to the hydrophobic-lipophilic balance of the demulsifier. The RSN may be determined by means of a titration against water of the demulsifier in a solvent system comprising of xylene, diethylene glycol monobutyl ether and dimethyl isosorbide. An RSN<13 generally indicate the demulsifier is more oil soluble whereas an RSN>18 generally indicates the demulsifier is more water soluble with values in the range 13 to 18 being generally dispersible. Further information on RSN is provided in Wu et al, Colloids and surfaces: A, Physicochemical and engineering aspects; 2004; Vol. 232(2-3); pages 229-237

The compound (I) may have an RSN of at least 8, preferably at least 10, more preferably at least 12. The compound (I) may have an RSN of at most 24, preferably at most 22, more preferably at most 20. Preferably the RSN of the compound (I) is from 10 to 20. A demulsifier with an RSN of from 10 to 20 may be advantageous because it may be generally dispersible within the oil and water phases of a crude oil. An RSN of 10 to 20 may indicate that the demulsifier is overall not too hydrophobic or hydrophillic so it may not reside to much in either the oil or water phases. If the demulsifier were to reside too much in only one of the phases, this may reduce its performance as a demulsifier.

The viscosity of the compound (I) may be measured at 25° C. on a Brookfield viscometer using a 29 Spindle at a shear rate of 0.25 N. The viscosity may be expressed in centipoise (cP). The viscosity of compound (I) at 25° C. may be at least 500 cP, preferably at least 1000 cP. The viscosity of compound (I) at 25° C. may be at most 15,000 cP, preferably at most 12,000 cP, more preferably at most 10,000 cP, even more preferably at most 8,000 cP. Preferably the compound (I) has a viscosity at 25° C. of 500 cP to 15,000 cP.

A viscosity of at most 10,000 cP at 25° C. may be advantageous for compound (I) because it may allow the demulsifier to be directly added to an emulsion without the need for specialist pumping equipment and may not require a solvent to reduce the viscosity of the demulsifier before adding it to the emulsion.

The pour point of the compound (I) may be measured on an ISL MPP 5Gs automated pour point analyser according to the ASTM D97 standard method. The pour point of the compound (I) may be at least −45° C., preferably at least −40° C. The pour point of the compound (I) may be at most+50° C., preferably at most 30° C., more preferably at most 20° C., even more preferably at most 15° C., yet more preferably at most 10° C. A lower pour point may be advantageous if the demulsifier is to be used in a cold temperature environment. Preferably the demulsifier has a pour point of from −45° C. to +30° C.

The compound (I) may be a liquid at room temperature.

The demulsifier may consist essentially of the compound (I) or consist of the compound (I). Preferably the demulsifier is a compound of the general formula (I). The demulsifier may comprised substantially no solvent or may not comprise solvent.

Alternatively, the demulsifier may also comprise a solvent. The solvent may be selected from toluene, xylene, heavy or light aromatic naphtha, diesel, isopropyl alcohol, methanol, 2-ethyl hexanol, butyl glycol ether, butyl diglycol, mono ethylene glycol and mixtures thereof. The solvent may further comprise water. Preferably the solvent comprises isopropyl alcohol and/or heavy aromatic naptha, more preferably the solvent comprises heavy aromatic naptha.

The solvent may be present in the demulsifier at a concentration of at least 5 wt % based on the total weight of the demulsifier, preferably at least 10 wt %, more preferably at least 20 wt % and most preferably at least 30 wt %. The solvent may be present in the demulsifier at a concentration of at most 90 wt % based on the total weight of the demulsifier, more preferably at most 80 wt % and most preferably at most 70 wt %.

The second aspect of the invention is a demulsion formulation which comprises the demulsifier of the first aspect. Preferably, the demulsification formulation is for demulsifying an oil-in-water or a water-in-oil emulsion.

Preferably, the demulsifier of the first aspect of the invention is present in the demulsification formulation at a concentration of at least 0.1 wt % based on the total weight of the demulsification formulation, preferably at least 0.5 wt %, more preferably at least 5 wt %. Preferably, the demulsifier is present in the demulsification formulation at a concentration of up to 80 wt % based on the total weight of the demulsification formulation, preferably up to 60 wt %, more preferably up to 50 wt %. Preferably, the demulsification formulation comprises 0.1 to 80 wt % of the demulsifier.

The demulsification formulation may also comprise a solvent. The solvent may be a derivative of the oil phase of the emulsion to be demulsified. The solvent may be selected from toluene, xylene, heavy or light aromatic naphtha, diesel, isopropyl alcohol, methanol, 2-ethyl hexanol, butyl glycol ether, butyl di-glycol, mono ethylene glycol and mixtures thereof. The solvent may further comprise water.

The demulsification formulation may further comprise a second demulsifying component. The second demulsifying component may be a resin component.

The demulsification formulation may further comprise at least one of a wetting agent, a dispersant (for example a wax dispersant and/or and asphaltene dispersant), a corrosion inhibitor and/or a pour point depressant.

The demulsifier or demulsification formulation may be used at a dosage rate of between 1 and 10,000 ppm, preferably between 5 and 5000 ppm, more preferably between 15 and 2000 ppm and most preferably between 20 and 1000 ppm in the emulsion to be demulsified.

The third aspect of the invention relates to a method of making a demulsifier by a process comprising two steps. In step a), an alkyleneoxy chain is formed. Dipropylene glycol may be used as the initiator for forming the alkyleneoxy chain. Once incorporated in the chain, the dipropylene glycol is equivalent to two propyleneoxy (PO) groups. In step b), the alkyleneoxy chains formed in step a) are reacted with at least one of a dimer fatty diacid, and/or a trimer fatty triacid to form the demulsifier.

The demulsifier may be a demulsifier of the first aspect of the invention.

The fourth aspect of the invention relates to a method of making a demulsifier by a direct alkoxylation process comprising three steps. In step a) at least one of a dimer fatty diacid, a trimer fatty triacid, a dimer fatty diol and/or a trimer fatty triol is reacted with ethylene oxide. In step b), the product of step a) is reacted with propylene oxide. In step c), the product of step b) is reacted with ethylene oxide.

The demulsifier may be a demulsifier of the first aspect of the invention.

The fifth aspect of the invention relates to a method of demulsifying an oil-in-water or a water-in-oil emulsion comprising the step of adding a demulsifier of the first aspect to the emulsion. Preferably the emulsion comprises crude oil.

The sixth aspect of the invention relates to the use as a demulsifier of a compound comprising a dimer and/or trimer fatty residue and an alkyleneoxy chain comprising a first ethyleneoxy section, a second ethyleneoxy section, and a propyleneoxy section located between the first ethyleneoxy section and the second ethyleneoxy section, wherein the propyleneoxy section comprises from 1 to 20 propyleneoxy groups. The compound may be a compound of the general formula (I) as described herein.

All of the features described herein may be combined with any of the above aspects, in any combination.

EXAMPLES

The present invention will now be described further by way of example only with reference to the following Examples. All parts and percentages are given by weight unless otherwise stated.

It will be understood that all tests and physical properties listed have been determined at atmospheric pressure and room temperature (i.e. about 20° C.), unless otherwise stated herein, or unless otherwise stated in the referenced test methods and procedures.

Compounds as used in the following examples are identified as follows:
  dimer fatty diacid—non-hydrogenated $C_{36}$ dimer fatty dicarboxylic acid including at least 70 wt % dimer diacid—ex Croda.
  trimer fatty triacid—non-hydrogenated $C_{54}$ trimer fatty tricarboxylic acid including at least 50 wt % trimer triacid—ex Croda.

Test Methods:
a) Relative Solubility Number (RSN) is a measure of the solubility of the demulsifier and corresponds to the hydrophobic-lipophilic balance of the demulsifier. The RSN is determined by means of a titration against water of the demulsifier (1 g) in a solvent system (30 g) comprising xylene (5 wt %), diethylene glycol monobutyl ether (20 wt %) and dimethyl isosorbide (75 wt %). The end point of the titration is when a persistent turbidity holds for at least one minute and the volume of water used in the titration (in ml) is the RSN. An RSN<13 generally indicates the demulsifier is more oil soluble whereas an RSN>18 generally indicates the demulsifier is more water soluble with values in the range 13 to 18 being generally dispersible. Further information on RSN is provided in Wu et al, Colloids and surfaces: A, Physicochemical and engineering aspects; 2004; Vol. 232(2-3); pages 229-237.

b) Interfacial tension is measured using a Tracker automated drop shape tensiometer manufactured by Teclis. The measurements are carried out by forming a droplet of 10 ppm of the demulsifier dissolved in toluene (an oil phase) in deionised water (an aqueous phase) and measuring the interfacial tension at the oil/water interface at 25° C. The droplet is pulsed throughout the test which expands and contracts the droplet area by ±10% before allowing it to relax. The change in interfacial tension at the oil/water interface is measured over time. The interfacial tension in mN/m is calculated using the Windrop software from Teclis. The software analyses the drop shape of the oil droplet in the aqueous phase during its expansion and contraction and calculates the corresponding interfacial tension. A reduction in interfacial tension may indicate that the demulsifier is effective in causing the phases to separate by promoting droplet coalescence and therefore indicates its ability to function as a demulsifier.

c) A bottle test was used to evaluate the demulsifiers which replicates on-field testing based on ASTM D96 & D4007. The bottle test was carried out at 60° C. with a demulsifier concentration of 200 ppm of demulsifier in the crude oil emulsion. Centrifugation was carried out at 2000 rpm. For the bottle test method the crude oil emulsion was placed into a centrifuge tube and preheated in a water bath. The demulsifier was then added and the centrifuge tube inverted 50 times. At 15 minute intervals the volume of water was recorded and after 60 minutes the interface quality and water clarity was noted. The centrifuge tubes were then placed into a centrifuge and the crude oil emulsion was centrifuged for 10 minutes. The volume of water out and any sediment was recorded along with the interface quality and water clarity.

d) The viscosity is measured at 25° C. on a Brookfield viscometer using a 29 Spindle at a shear rate of 0.25 N.

e) The pour point is measured on an ISL MPP 5Gs automated pour point analyser according to the ASTM D97 standard method.

f) Number average molecular weight and weight average molecular weight was determined by Gel Permeation Chromatography (GPC). The apparatus and settings used for the GPC are given in Table 4 below.

g) The hydroxyl value is defined as the number of mg of potassium hydroxide equivalent to the hydroxyl content of 1 g of sample, and was measured by acetylation followed by hydrolysation of excess acetic anhydride. The acetic acid formed was subsequently titrated with an ethanolic potassium hydroxide solution.

h) The acid value is defined as the number of mg of potassium hydroxide required to neutralise the free fatty acids in 1 g of sample, and was measured by direct titration with a standard potassium hydroxide solution.

Preparation Examples

Demulsifier 1

Demulsifier 1 was prepared in a 2 step process:
a. an alkyleneoxy chain of the ABA sequence 5EO-5PO-5EO was formed; and
b. the alkyleneoxy chain was reacted with dimer fatty diacid ex Croda as mentioned above in the introduction to the Examples.

a. Formation of 5EO-5PO-5EO Alkyleneoxy Chain 7000.00 g of di(propylene glycol), 100.00 g potassium hydroxide and 110.00 g water was charged to an alkoxylation reactor, with nitrogen sparge and vacuum capability. The reaction vessel was then heated to 125° C. and vacuum of 0.2 mbar applied. 9200.00 g propylene oxide was charged and reacted for 1 hour. The pressure was then increased to 2 bar and vessel heated gently to 150° C. and 22500.00 g ethylene oxide was charged and stirred for two hours. The reaction was continued until a hydroxyl value in the range of 140.0-160.0 mg KOH g$^{-1}$ was achieved. The vessel was cooled to 80° C. and 50.00 g lactic acid to neutralise the potassium hydroxide was charged and stirred for 1 hour.

The product was a 5EO-5PO-5EO alkyleneoxy chain.

b. Formation of Demulsifier 1

1200 g of dimer fatty diacid ex Croda, 2891.57 g of the 5EO-5PO-5EO alkyleneoxy chain from step a. and 4.09 g of para toluene sulphonic acid (p-TSA) were charged to a flask, fitted with stirrer, side-arm distillation, thermocouple, nitrogen sparge and thermostatted electric mantle. The reaction mixture was then heated gently with stirring to 220° C. and water distilled off. The reaction was continued until the acid value was less than 5.0 mg KOH g$^{-1}$. The product, referred to herein as Demulsifier 1, was then cooled and discharged.

Demulsifiers 2 to 5

Demulsifiers 2 to 5 were prepared according to the 2 step process described above for Demulsifier 1, with suitable adaptions to the quantities and ingredients used. The quantities and ingredients used to produce Demulsifiers 2 to 5 are given in Table 1.

TABLE 1

Ingredients for Demulsifiers 2 to 5

| Demulsifier | Dimer/Trimer | Quantity (g) | Alkyleneoxy Chain | Quantity (g) | Catalyst | Quantity (g) |
| --- | --- | --- | --- | --- | --- | --- |
| 2 | Dimer fatty diacid | 900 | 7EO-7PO-7EO | 3184 | p-TSA | 4.1 |
| 3 | Trimer fatty triacid | 1200 | 5EO-5PO-5EO | 2897 | p-TSA | 4.1 |
| 4 | Trimer fatty triacid | 900 | 7EO-7PO-7EO | 3190 | p-TSA | 4.1 |
| 5 | Trimer fatty triacid | 800 | 9EO-9PO-9EO | 3206 | p-TSA | 4.0 |

Demulsifier 6 to 8

Demulsifier 6 was prepared using a direct alkoxylation process as follows.

1000 g of trimer fatty triacid ex Croda as mentioned above, 8 g potassium hydroxide and 9 g water were charged to an alkoxylation reactor, with nitrogen sparge and vacuum capability. The reaction vessel was then heated to 125° C. and vacuum of 0.2 mbar applied. 740 g ethylene oxide was charged, the pressure increased to 2.4 bar and heated gently to 150° C. for 2 hours. The pressure was then dropped to 0.2 bar and temperature to 125° C. 958 g propylene oxide was charged and stirred for two hours. Finally, 740 g of ethylene oxide was then charged, the vessel heated gently to 150° C. and pressure increased to 2.4 bar for two hours. The reaction was continued until a hydroxyl value of less than 70 mg KOH g$^{-1}$ was obtained. The resulting product will be referred to herein as Demulsifier 6.

Demulsifiers 7 and 8 were prepared according to the direct alkoxylation process described above for Demulsifier 6, with suitable adaptions to the quantities of ingredients used.

The resulting composition of Demusifiers 6, 7 and 8 is given in Table 2.

TABLE 2

Composition for Demulsifiers 6, 7 and 8

| Demulsifier | Dimer/Trimer | Alkyleneoxy Chain |
| --- | --- | --- |
| 6 | Trimer fatty triacid | 5EO-5PO-5EO |
| 7 | Trimer fatty triacid | 7EO-7PO-7EO |
| 8 | Trimer fatty triacid | 9EO-9PO-9EO |

Experimental Examples

Physical Properties of Demulsifiers 1 to 8

Various physical properties of Demulsifiers 1 to 8 were tested according to the test methods described in the introduction to the Examples. The results are given in Table 3.

TABLE 3

Physical Properties of Demulsifiers 1 to 8

| Demulsifier | Physical form at room temperature | Colour (visual determination) | Relative Solubility Number | Viscosity at 25° C. (cP) | Pour Point (° C.) |
|---|---|---|---|---|---|
| 1 | Liquid | Yellow | 14 | 2400 | −21 |
| 2 | Liquid | Yellow | 14 | 6700 | 0 |
| 3 | Liquid | Yellow | 15 | 4600 | −27 |
| 4 | Liquid | Yellow | 18 | 3200 | −18 |
| 5 | Liquid | Yellow | 15 | 3600 | 0 |
| 6 | Liquid | Yellow | 14 | 1800 | −30 |
| 7 | Liquid | Yellow | 16 | 1400 | −30 |
| 8 | Liquid | Yellow | 16 | 3900 | −30 |

Molecular Weights of Demulsifiers 1 to 8

The molecular weights of Demulsifiers 1 to 8 were determined using Gel Permeation Chromatography (GPC). The apparatus and settings used for the GPC are given in Table 4.

TABLE 4

GPC apparatus and settings

| | |
|---|---|
| Spectrometer | Polymer labs GPC-50 |
| Detector | Refractive index |
| Columns | PL gel 3 µm 100A & PL gel 5 µm mixed D |
| Solvent | Tetrahydrofuran (GPC grade). |
| Concentration of test substance | 1% |
| Colum temperature | 40° C. |
| Flow rate | 1 ml per minute |
| Injection Volume | 20 micro litre |
| Analysis time | 25 minutes |
| Method Type | Area Normalisation |

Demulsifiers 1 to 8 were tested using the apparatus and settings given in Table 4. All of Demulsifiers 1 to 8 had a molecular weight (number average) in the range from 1500 Da to 3500 Da. All of Demulsifiers 1 to 8 had a molecular weight (weight average) in the range from 3000 Da to 6000 Da.

Analytical Properties of Demulsifiers 1 to 8

Analytical properties of Demulsifiers 1 to 8 were determined and the results are given in Table 5.

TABLE 5

Analytical properties of Demulsifiers 1 to 8

| | Analytical Data | |
|---|---|---|
| Demulsifier | Acid Value (mgKOH/g) | Water Content (wt %) |
| 1 | 4.9 | 0.1 |
| 2 | 4.8 | 0.2 |
| 3 | 4.4 | 0.1 |
| 4 | 4.4 | 0.1 |
| 5 | 3.7 | 0.1 |
| 6 | 1.8 | 0.1 |
| 7 | 1.7 | 0.1 |
| 8 | 1.7 | 0.1 |

Solubilities of Demulsifiers 1 to 8 in Various Solvents

The solubility of demulsifiers 1 to 8 in various solvents was tested by visual inspection. 10 wt % of the demulsifier was placed in an amount of the solvent in a vial. The vial was then shaken and a visual assessment was carried out to determine whether the demulsifier was soluble (completely dissolved and clear solution), dispersible (dissolves but cloudy/hazy solution) or insoluble (does not dissolve). The results are given in Table 6.

TABLE 6

Solubilities of Demulsifiers 1 to 8 in various solvents

| | Solubility of Demulsifier at 10 wt % in Solvent | | | |
|---|---|---|---|---|
| Demulsifier | Deionised water | Isopropanol | Kerosene | Heavy Aromatic Naptha |
| 1 | Soluble | Soluble | Insoluble | Soluble |
| 2 | Soluble | Soluble | Insoluble | Soluble |
| 3 | Soluble | Soluble | Insoluble | Soluble |
| 4 | Soluble | Soluble | Insoluble | Soluble |
| 5 | Soluble | Soluble | Insoluble | Soluble |
| 6 | Soluble | Soluble | Insoluble | Soluble |
| 7 | Soluble | Soluble | Insoluble | Soluble |
| 8 | Soluble | Soluble | Insoluble | Soluble |

Interfacial Tension Performance of Demulsifiers 1 to 8

Interfacial tension (IFT) is a property of the interface between two immiscible liquids. Demulsifier molecules preferentially position themselves at the interface and thereby lower the interfacial tension and promote coalescence of the water phase. The measured IFT of a mixture of the demulsifier and a reference solution is an indicator of the demulsifying performance of the demulsifier. A lower IFT value indicates a better demulsifier.

The IFT is measured using a Tracker automated drop shape tensiometer manufactured by Teclis as described in the test method section above. The tracker can measure variations in interfacial tension over time as well as being able to oscillate the drop. The measurements are carried out by forming a droplet of demulsifier in a solvent (toluene) within an aqueous phase. The IFT measurements decrease over time as the demulsifier takes effect. The IFT measurements are given in Table 7.

TABLE 7

IFT measurements for Demulsifiers 1 to 8

| | Interfacial Tension (IFT) value in mN/m after specified time in seconds | | | | | Time in seconds after which IFT is 17 mN/m (50% of initial value) |
|---|---|---|---|---|---|---|
| Demulsifier | 0 s | 600 s | 1000 s | 2000 s | 3000 s | |
| 1 | 34.0 | 15.0 | 14.5 | 14.0 | 13.9 | 140 |
| 2 | 34.0 | 12.3 | 11.7 | 11.2 | 11.0 | 80 |

TABLE 7-continued

IFT measurements for Demulsifiers 1 to 8

| Demulsifier | Interfacial Tension (IFT) value in mN/m after specified time in seconds | | | | | Time in seconds after which IFT is 17 mN/m (50% of initial value) |
|---|---|---|---|---|---|---|
| | 0 s | 600 s | 1000 s | 2000 s | 3000 s | |
| 3 | 34.0 | 13.5 | 12.9 | 12.2 | 11.9 | 120 |
| 4 | 34.0 | 11.5 | 10.8 | 10.1 | 9.8 | 90 |
| 5 | 34.0 | 13.2 | 12.6 | 12.0 | 11.8 | 110 |
| 6 | 34.0 | 16.9 | 16.3 | 15.6 | 15.5 | 560 |
| 7 | 34.0 | 16.7 | 16.0 | 15.3 | 15.1 | 490 |
| 8 | 34.0 | 14.4 | 13.7 | 13.2 | 13.0 | 170 |

As can be seen from the results in Table 7, the interfacial tension for all the systems at the moment when the demulsifier is added is 34 mN/m i.e. this is the initial interfacial tension before the demulsifier has begun to have an effect on the system. By 600 seconds, all of demulsifiers 1 to 8 have reduced the interfacial tension in the system by more than 50% i.e. the interfacial tension has dropped below 17 mN/m. This demonstrates that all of demulsifiers 1 to 8 work effectively to reduce the interfacial tension in an oil/water system and therefore will be effective as demulsifiers for oil-in-water and water-in-oil emulsions. The time for the demulsifier to reduce the interfacial tension to 50% of its initial value varies from 80 seconds for demulsifier 2 up to 560 seconds for demulsifier 6.

Bottle Test Demulsification Performance of Demulsifiers 1 to 7 and Comparative Example Identical samples of unprocessed crude oil were treated with demulsifiers 1 to 7 and analysed by a bottle test as set out in test method c) above. Data was not available for demulsifier 8. The crude oil samples had an API gravity of 16° at 25° C. and so are classed as heavy crude oil. The total water content of the crude oil samples was determined as 56.1 wt % according to the Karl Fischer method. A known demulsifier which is based on a nonyl-phenol formaldehyde resin was used as a comparative example. At the end of the bottle test, the percentage of water which had been demulsified when compared with the total water content of the crude oil samples is given in Table 8.

TABLE 8

Bottle test results for Demulsifiers 1 to 7 and comparative example

| Demulsifier | Dose rate (ppm) | Water out (% of total water content demulsified) |
|---|---|---|
| 1 | 200 | 86% |
| 2 | 200 | 78% |
| 3 | 200 | 71% |
| 4 | 200 | 73% |
| 5 | 200 | 86% |
| 6 | 200 | 64% |
| 7 | 200 | 78% |
| Comparative example - nonyl-phenol formaldehyde resin | 200 | 61% |

It can be seen from Table 8 that demulsifiers 1 to 7 demulsified more of the total water present in the crude oil samples than the comparative nonyl-phenol formaldehyde resin example. On the basis of this test, demulsifiers 1 to 7 show improved demulsification performance when compared with a known demulsifier which is based on a nonyl-phenol formaldehyde resin.

It is to be understood that the invention is not to be limited to the details of the above embodiments, which are described by way of example only. Many variations are possible.

The invention claimed is:

1. A compound of the general formula (I):

$$R^1[(EO)_p(PO)_q(EO)_rR^2]n \qquad (I)$$

where:
R$^1$ comprises a mixture of dimer fatty residues and trimer fatty residues and the weight ratio of dimer fatty residues to trimer fatty residues is from 20 to 0.2:1;
R$^2$ is H or $(CO)_xR^3$ where x is 0 or 1 and R$^3$ is a C$_1$ to C$_6$ aliphatic hydrocarbyl group;
EO is an ethyleneoxy group;
PO is a propyleneoxy group;
p is from 1 to 20;
q is from 1 to 20;
r is from 1 to 20; and
n is from 1 to 3.

2. A compound as claimed in claim 1 wherein p is from 3 to 15.

3. A compound as claimed in claim 1 wherein q is from 3 to 15.

4. A compound as claimed in claim 1 wherein r is from 3 to 15.

5. A compound as claimed in claim 1 wherein the ratio of (p+r) to q is from 0.5 to 8:1.

6. A compound as claimed in claim 1 wherein the ratio of p to q to r is from 0.5 to 2:from 0.5 to 2:from 0.5 to 2.

7. A compound as claimed in claim 1 wherein of the mixture of dimer fatty residues and trimer fatty residues comprises at least one of: a dimer fatty diacid having from 24 to 48 carbon atoms, a trimer fatty triacid having from 36 to 72 carbon atoms, a dimer fatty diol having from 24 to 48 carbon atoms and/or a trimer fatty triol having from 36 to 72 carbon atoms.

8. A compound as claimed in claim 1 wherein the mixture of dimer fatty residues and trimer fatty residues comprises a mixture of dimer fatty diacid residues and trimer fatty triacid residues and the weight ratio of dimer fatty diacid to trimer fatty triacid is from 20 to 0.2:1.

9. A compound as claimed in claim 1 wherein R$^2$ is H.

10. A compound as claimed in claim 1 wherein the compound of general formula (I) has a viscosity at 25° C. of 500 cP to 15,000 cP.

11. A compound as claimed in claim 1 wherein the compound of general formula (I) has a pour point of −45° C. to +30° C.

12. A demulsification formulation comprising 0.1 to 80 wt % of a compound as claimed in claim 1.

13. A method of making a compound comprising the steps of:
a) forming an alkyleneoxy chain of the general formula (II):

$$HO(EO)_p(PO)_q(EO)_rH \qquad (II)$$

where:
EO is an ethyleneoxy group;
PO is a propyleneoxy group;
p is from 1 to 20;
q is from 1 to 20; and
r is from 1 to 20; and b) reacting the alkyleneoxy chain with a mixture of a dimer fatty diacid, and a trimer fatty triacid, wherein the weight ratio of dimer fatty diacid to trimer fatty triacid is from 20 to 0.2:1.

14. A method of making a compound comprising the steps of:
   a) reacting a mixture of a dimer fatty diacid and a trimer fatty triacid with 2 to 60 mols of ethylene oxide, wherein the weight ratio of dimer fatty diacid to trimer fatty triacid is from 20 to 0.2:1;
   b) reacting the product of step a) with 2 to 60 mols of propylene oxide; and
   c) reacting the product of step b) with 2 to 60 mols of ethylene oxide.

15. A method as claimed in claim 14 wherein the compound is a compound of general formula (I):

$$R^1[(EO)_p(PO)_q(EO)_r R^2]_n \qquad (I)$$

where:
   $R^1$ comprises a mixture of residues of the dimer fatty diacid and the trimer fatty triacid, wherein the weight ratio of dimer fatty diacid to trimer fatty triacid is from 20 to 0.2:1;
   $R^2$ is H;
   EO is an ethyleneoxy group;
   PO is a propyleneoxy group;
   p is from 2 to 20;
   q is from 2 to 20;
   r is from 2 to 20; and
   n is from 1 to 3.

16. A method of demulsifying an oil-in-water or a water-in-oil emulsion comprising the step of adding a compound as claimed in claim 1 to the emulsion.

17. A method as claimed in claim 16 wherein the emulsion comprises crude oil.

* * * * *